UNITED STATES PATENT OFFICE 1,984,715

DYESTUFFS OF THE ANTHRAQUINONE SERIES

Klaus Weinand, Leverkusen-I. G. Werk, and Hans Hertlein, Leverkusen-Wiesdorf, Germany, assignors to General Aniline Works, Inc., New York, N. Y., a corporation of Delaware No Drawing. Application June 3, 1933, Serial No. 674,261. In Germany June 6, 1932

5 Claims. (Cl. 260—60)

The present invention relates to a process of preparing dyestuffs of the anthraquinone series and to the new products obtainable by said process.

It is the object of our invention to provide new dyestuffs of the anthraquinone series possessing the property of dyeing wool or other animal fibers clear strong shades, and which are simultaneously valuable dyestuffs for the dyeing of vegetable fibers (cotton, viscose etc.) from a neutral or weakly alkaline bath.

The dyestuffs in question correspond in their free form to the probable formula:—

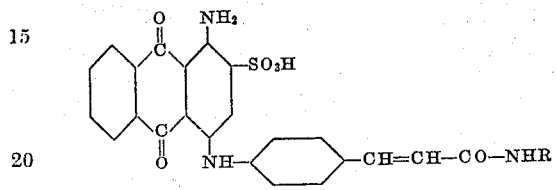

wherein R means hydrogen, alkyl or a substituted or unsubstituted phenyl- or benzyl radical.

The new dyestuffs may be prepared by heating a compound of the probable formula:—

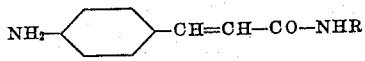

wherein R is to be explained as mentioned above, on an 1-amino-4-halogenanthraquinone-2-sulfonic acid or a salt thereof in an aqueous medium with or without the addition of an organic solvent miscible with water, such as ethylalcohol or pyridine. Advantageously, an acid binding agent, such as sodium or potassium carbonate or bicarbonate, and, furthermore, a copper catalyst, such as copper itself, copper oxide, copper chloride, cuprous bromide, copper acetate or other copper salts, are added to the reaction mixture. Preferred temperature ranges for performing the reaction are those between about 60° C. and the boiling point of the reaction mixture.

Higher and lower temperatures are likewise operable but inconvenient, since in the former case the application of superatmospheric pressure will be unavoidable, whereas in the latter case the reaction performs too slowly.

The products thus obtainable form blue to bluish-green needles, dissolving in water with a blue to bluish-green coloration and dyeing animal fibers from a neutral or weakly alkaline bath strong blue to bluish-green shades of excellent fastness properties.

The following examples illustrate the invention, without, however, restricting it thereto, the parts being by weight:—

Example 1

10 parts of 1-amino-4-bromoanthraquinone-2-sulfonic acid are heated to boiling for about two hours with 10 parts of para-amino-cinnamic acid methylamide, 8 parts of sodium carbonate, 0.5 part of cuprous chloride and 300 parts of water. On cooling the dyestuff separates in form of bronze glittering needles, which dissolve in water with a clear blue coloration and dye cotton from a sodium sulfate bath strong blue shades of excellent fastness properties.

Example 2

10 parts of 1-amino-4-bromoanthraquinone-2-sulfonic acid are heated to boiling for about 3 hours with 10 parts of para-amino-cinnamic acid anilide, 0.5 part of cuprous chloride and 10 parts of sodium bicarbonate in a mixture of 200 parts of water and 100 parts of alcohol. After cooling the new dyestuff separates in form of bluish-green needles, which dissolve in water with a bluish-green coloration and dye viscose according to the customary method in bluish-green shades of excellent fastness properties.

When substituting in the above examples the para-amino-cinnamic acid anilide by para-amino-cinnamic acid-para'-acetylamino-anilide

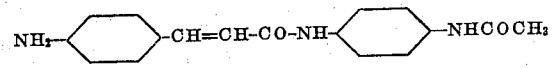

or paraamino-cinnamic acid-para'-methoxyanilide

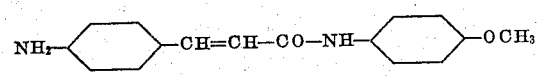

dyestuffs of a more greenish shade are obtained.

Likewise instead of the above mentioned acetylamino-anilide or methoxyanilide other acylaminoanilides, for example, the para-propionylamino anilide, the ortho- or para-benzoyl-aminoanilide, the ortho- or para-methoxy- or propionyloxyanilide, the dimethoxy anilide etc., may be used. Benzylanilides of the para-amino cinnamic acid, which are substituted in the benzyl residue by the above named or by other substituents, may also be aplied with a good effect. Furthermore, instead of the 1-amino-4-bromoanthraquinone-2-sulfonic acid their salts or the corresponding chloroderivatives can be used.

We claim:—

1. The process which comprises heating a compound having in its free form the formula

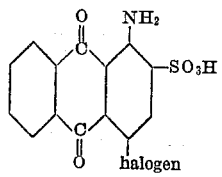

with a compound of the formula:—

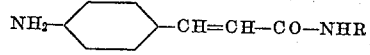

wherein R means hydrogen, alkyl or a phenyl or benzyl radical, in an aqueous medium.

2. The process as claimed in claim 1, in which the reaction is performed in the presence of an acid binding agent and a copper catalyst at a temperature between about 60° C. and the boiling point of the reaction mixture.

3. The compounds having in their free form the formula:—

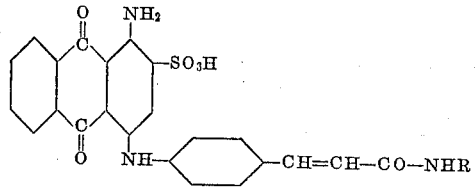

wherein R means hydrogen or a phenyl or benzyl radical, said compounds being in form of their alkali metal salts blue to bluish-green crystals, dissolving in water with the same coloration, dyeing vegetable fibers from a neutral or weakly alkaline bath strong blue to bluish-green shades of excellent fastness properties.

4. The product having in its free form the formula:

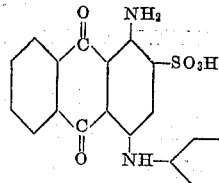

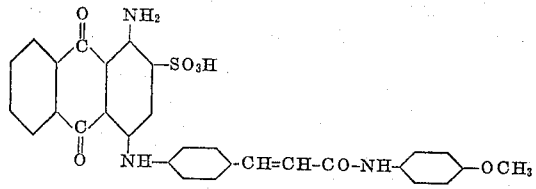

dyeing animal fibers from an aqueous sodium sulfate bath bluish-green shades of excellent fastness properties, especially to light.

5. The product having in its free form the formula:— dyeing animal fibers from a sodium sulfate bath strong greenish blue shades of excellent fastness properties.

KLAUS WEINAND.
HANS HERTLEIN.